United States Patent
Bense

(10) Patent No.: US 8,529,727 B2
(45) Date of Patent: Sep. 10, 2013

(54) METHOD AND DEVICE FOR FITTING A FUSELAGE SHELL WITH A WINDOW FRAME

(75) Inventor: Rolf Bense, Jork (DE)

(73) Assignee: Airbus Operations GmbH, Hamburg (DE)

( * ) Notice: Subject to any disclaimer, the term of this patent is extended or adjusted under 35 U.S.C. 154(b) by 65 days.

(21) Appl. No.: 13/105,950

(22) Filed: May 12, 2011

(65) Prior Publication Data

US 2011/0277924 A1  Nov. 17, 2011

Related U.S. Application Data

(60) Provisional application No. 61/333,774, filed on May 12, 2010.

(30) Foreign Application Priority Data

May 12, 2010 (DE) .......................... 10 2010 020 368

(51) Int. Cl.
*B64C 1/14* (2006.01)
*B32B 37/00* (2006.01)

(52) U.S. Cl.
USPC ............. 156/293; 156/307.1; 264/271.1; 264/275; 244/129.3

(58) Field of Classification Search
USPC ............ 244/129.3–129.5, 118.3; 264/271.1, 264/274, 275, 642; 156/71, 293, 307.1
See application file for complete search history.

(56) References Cited

U.S. PATENT DOCUMENTS

| | | | | |
|---|---|---|---|---|
| 4,717,330 A * | 1/1988 | Sarh | ......................... | 425/403 |
| 5,634,302 A * | 6/1997 | Lee | .......................... | 52/127.3 |
| 6,485,594 B1 | 11/2002 | Pabsch | | |
| 2006/0123718 A1 | 6/2006 | Paspirgilis | | |
| 2008/0067288 A1 | 3/2008 | Eberth | | |
| 2008/0078876 A1 | 4/2008 | Baggette | | |
| 2009/0230246 A1 | 9/2009 | Depeige | | |
| 2010/0043300 A1 | 2/2010 | Krafn | | |

FOREIGN PATENT DOCUMENTS

| | | |
|---|---|---|
| DE | 19739291 C1 | 8/1998 |
| DE | 102004050399 A1 | 4/2006 |
| DE | 102006044093 A1 | 4/2008 |
| DE | 102006053967 A1 | 5/2008 |

* cited by examiner

*Primary Examiner* — Katarzyna Wyrozebski Lee
*Assistant Examiner* — Scott W Dodds
(74) *Attorney, Agent, or Firm* — Leydig, Voit & Mayer, Ltd.

(57) ABSTRACT

A method of fitting a fuselage shell of an aircraft with at least one window frame of a cabin window includes positioning an uncured laminate including a fiber-reinforced plastic-based composite material configured to form a fuselage shell on a mold surface. A window aperture is introduced into the laminate. A window frame including a fiber-reinforced plastic-based composite material is positioned on the laminate in a region of the window aperture. The laminate is cured under the action of pressure and temperature so as to connect the window frame with the laminate by a material bond.

7 Claims, 1 Drawing Sheet

METHOD AND DEVICE FOR FITTING A FUSELAGE SHELL WITH A WINDOW FRAME

CROSS REFERENCE TO RELATED APPLICATIONS

This application claims priority to U.S. Provisional Patent Application No. 61/333,774, filed May 12, 2010, and German Patent Application No. DE 10 2010 020 368.8, filed May 12, 2010, both of which are incorporated by reference herein in their entireties.

FIELD

The invention relates to a method for fitting a fuselage shell of an aircraft with at least one window frame of a cabin window, and a device for implementing such a method.

BACKGROUND

Cabin windows for aeroplanes, as conventionally shown in the patent application DE 10 2006 053 967 A1, have a window frame to receive a pane pack, which, after fuselage assembly is complete, is introduced into a window aperture and riveted to the outer skin of the aeroplane. Riveting and/or the use of mechanical connecting elements is, however, in the case of outer skins consisting of laminates and window frames of fibre-reinforced composite materials, such as CFRPs, only of limited suitability, since the connecting elements, and in particular the holes to receive the connecting elements represent a significant weakening of the structure in question. Furthermore, the connecting elements usually consist of a metallic material, which fundamentally can lead to corrosion. Furthermore differing thermal expansion coefficients of the metallic connecting elements and the plastic-based components can cause stresses to arise between the connecting elements and the components, which must be accommodated via the connecting elements. While it is true that from the production and assembly point of view the composite form of construction offers many degrees of freedom, very many tools are also required to stabilise and/or support the individual components during their curing process, which makes the production process relatively complex.

SUMMARY

An aspect invention is to provide a method for fitting a fuselage shell of an aircraft with at least one window frame of a cabin window, which eliminates the disadvantages cited above, and in structural mechanics terms stabilises the fuselage shell in the region of the cabin window, and a device for implementing such a method.

In an embodiment, the present invention provides method of fitting a fuselage shell of an aircraft with at least one window frame of a cabin window. The method includes positioning an uncured laminate including a fiber-reinforced plastic-based composite material configured to form a fuselage shell on a mold surface. A window aperture is introduced into the laminate. A window frame including a fiber-reinforced plastic-based composite material is positioned on the laminate in a region of the window aperture. The laminate is cured under the action of pressure and temperature so as to connect the window frame with the laminate by a material bond.

BRIEF DESCRIPTION OF THE DRAWINGS

Exemplary embodiments of the present invention are described in more detail below with reference to schematic representations shown in the drawings, in which.

DETAILED DESCRIPTION

Figure 1:
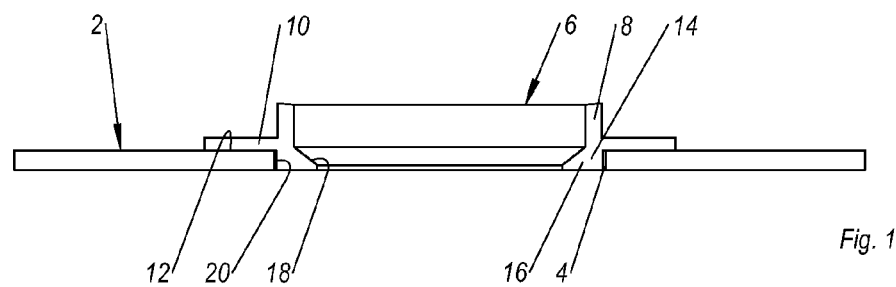
FIG. 1 shows a longitudinal section through a fuselage shell in the region of a window aperture with a window frame inserted.

In a method in accordance with the invention for fitting a fuselage shell of an aircraft with at least one window frame of a cabin window, an uncured laminate of a fibre-reinforced plastic-based composite material is firstly positioned on a mould surface for purposes of forming the fuselage shell. Then at least one window aperture is introduced into the laminate and a window frame of a cured fibre-reinforced plastic-based composite material is subsequently arranged on the laminate in the region of the window aperture. Then the laminate is cured under the action of pressure and temperature, wherein the window frame is connected via a material bond with the laminate.

In the solution in accordance with the invention it is advantageous that any mechanical connecting elements such as rivets for purposes of attaching the window frame are dispensed with, and instead the latter is solely bonded or cemented with the laminate of the fuselage shell. As a result there is no weakening of the fuselage outer skin in the region of the window aperture, but instead a very good reinforcement and stabilisation. Furthermore, the installation and/or connection of the window frame is facilitated, since holes for the connecting elements, and the setting of the same per se, are no longer necessary. While it is true that in the method in accordance with the invention the window apertures should also per se be introduced into the laminate, i.e. the fuselage shell, this takes place in the wet state of the laminate, which in comparison to time-intensive milling tasks in cured fuselage shells is a significant simplification. A fuselage manufactured by the method in accordance with the invention, and an aircraft having such a fuselage, can advantageously be low weight, by virtue of the elimination the mechanical connecting elements. Furthermore, as a result of the elimination of the connecting elements corrosion in the region of the window frame is not to be feared. In addition, the window frame and the laminate, by virtue of having the same materials or a high degree of similarity of material, have the same, or essentially the same, thermal expansion coefficients, so that the appearance of thermal stresses between the window frame and the laminate and/or the outer skin is prevented. Furthermore, differences in wall thickness arising as a result, for example, of doubling, do not have to be taken into consideration, since no connecting elements with corresponding lengths need to be selected.

Furthermore, it is especially advantageous in accordance with embodiments of the invention that the already cured window frame serves as an alignment and positioning tool for the laminate and/or for the window apertures during the curing process of the laminate, so that the use of external alignment and positioning tools is rendered unnecessary, and thus the number of production steps, production time and production costs are reduced.

In one method in accordance with the invention the window frame is manufactured from a composite material on a thermosetting plastic base. Thermosetting plastics are temperature-resistant after curing has taken place, so that they remain stable in shape when the laminate is subjected to the action of pressure and temperature. Here the laminate can also consist of a material on a thermosetting plastic base, and curing can take place in an autoclave. Alternatively, however, the laminate can also consist of a material on a thermoplastic base, so that during the action of pressure and temperature it is solidified rather than cured, and as a result an autoclave can be dispensed with, leading to a further reduction of production effort and production costs.

To ensure that no alteration of the position or location of the window frame takes place during the curing or solidifying process, making potentially necessary laborious reworking of the window aperture, and/or leading to scrapping of the fuselage shell, the window frame is secured in its location on the mould surface via a positioning aid. The latter preferably has an outer contour that corresponds to an inner contour of the window aperture, so that as large as possible a region of contact is achieved between the positioning aid and the laminate in the region of the window aperture.

A device in accordance with an embodiment of the invention has a tool that has a mould surface for purposes of laying-up a laminate, for example, for the formation of a fuselage shell of an aeroplane fuselage. Furthermore, the device has a multiplicity of positioning aids, wherein a multiplicity of positioning means acting together with the positioning aids for purposes of positioning and securing the location of the positioning aids are integrated into the mould surface. The positioning aids can be introduced into apertures of the laminate, and serve as alignment and positioning tools for the laminate, i.e. for the apertures, during the curing of the laminate.

The positioning means are, for example, holes, in which the positioning aids are located with corresponding pins or dowels, respectively. In order to obtain an optimal alignment of the positioning aids corresponding to their required positions on the mould surface it is advantageous if the dowels on the positioning aid can only be introduced in a pre-aligned position, i.e. with a certain orientation, into the holes, and any subsequent rotation of the positioning aids on the mould surface is prevented. Alternatively the positioning aids can also have pairs of pins, which can be introduced into corresponding pairs of holes. At the same time a check can be made by means of the positioning aids in their required positions as to whether the apertures are located within permissible tolerances.

FIG. 1 shows a longitudinal section through a shell element 2 of an aeroplane fuselage in the region of a window aperture 4. The aeroplane fuselage is composed of a multiplicity of shell elements 2, which are connected with one another in the longitudinal direction and in the circumferential direction.

The shell element 2 consists of a cured laminate 22 (FIGS. 2, 3 and 4) of a fibre-reinforced composite material, such as a carbon fibre-reinforced plastic (CFRP) on a thermosetting plastic base. In the region of the window aperture 4 on the cabin side, i.e. on the inner side, a window frame 6 is arranged on the shell element 2. Longitudinal and circumferential stiffeners for purposes of stiffening the shell element 2 are not represented in the interests of clarity.

The window frame 6 forms a part of a cabin window, not described in any further detail, and serves in particular for the reception and connection of a windowpane pack, not shown, of the cabin window. It consists of a cured fibre-reinforced composite material, such as a carbon fibre-reinforced plastic on a thermosetting plastic base, but can also consist of a thermoplastic material. It has a cylindrical wall 8 and is supported by a radially-outboard shoulder 10 on a surface section 12 of the shell element 2 surrounding the window aperture 4 in the form of a frame, wherein with an end section 14 it is immersed in the window aperture 4. In the region of the end section 14 is designed a radially-inboard projection 16, which has a wedge face 18 for the reception of the windowpane pack, which via a pressure frame, not shown, is mechanically loaded with the window frame 6.

The connection of the window frame 6 to the shell element 2 takes place solely via a material bond and thus without mechanical connecting elements such as rivets, wherein in particular the shoulder 10 is bonded or welded with the surface section 12. In addition the window frame 6 in the region of its end section 14 is bonded around its periphery with an inner peripheral surface 20 bounding the window aperture 4.

Figure 2:
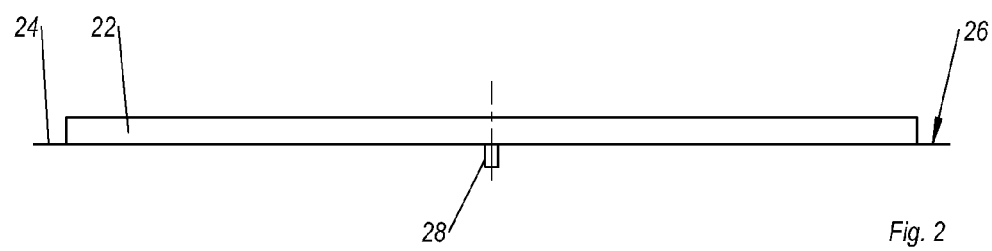
FIGS. 2 to 4 show steps in the method for connecting the window frame from FIG. 1 to a laminate for purposes of forming the fuselage shell.

In what follows a preferred method is elucidated for fitting a shell element 2 of an aeroplane fuselage with a window frame 6 in accordance with an embodiment of the invention. As shown in FIG. 2 a laminate 22 for the formation of the shell element 2 is firstly laid up in the wet state on a mould surface 24 of a negative mould 26 of a device that is not described in any further detail.

Figure 3:
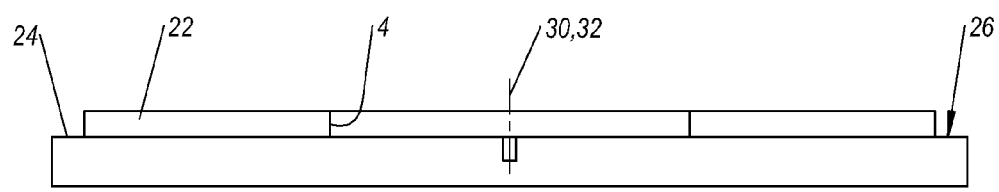

The mould surface 24 reproduces the fuselage geometry in question, and has a multiplicity of depressions 28, for example, holes. The number and alignment of the holes 28 corresponds to the number and alignment of the window apertures 4 to be introduced into the laminate 22. That is to say, with window apertures 4 arranged one behind another in the longitudinal direction, the holes 28 are arranged one behind another in the longitudinal direction of the mould surface 24. After the laying-up of the laminate 22 on the mould surface 24 the window apertures 4 are introduced into the laminate 22 in the region of the holes 28, for example, by means of a cutting process, wherein the window apertures 4 are then formed and positioned in accordance with the specifications, if as is shown in FIG. 3, the longitudinal axes 30 of the holes and the axes of symmetry 32 of the window apertures 4 are aligned with one another.

Figure 4:
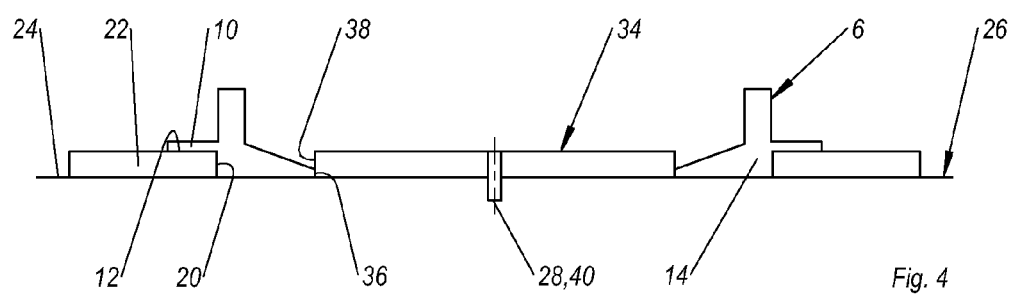

Then, as shown in FIG. 4, the window frames 6 in the cured state are inserted with their end sections 14 into the window apertures 4 until their shoulders 10 abut against the surface sections 12. Then in each case a positioning aid 34 of the device in accordance with the invention is placed in position in the window frame 6 on the mould surface 24.

The positioning aids 34 serve to secure the location of the window frame 6 during the curing of the shell element 2 and consist of a pressure- and temperature-resistant material. They have an outer contour 38 corresponding to an inner contour 36 of the window frame 6 in the region of its projection 14. For purposes of securing the location, i.e. positioning, on the mould surface 24 in a required position they have in each case a centrally arranged pin-shaped element 40 for insertion into the hole 28. The pin-shaped element 40 can only be inserted in a particular orientation into the holes 26, so that any incorrect alignment of the positioning aids 34 is prevented.

After the positioning of the positioning aids 34 the laminate 22 undergoes a curing process, for example in an autoclave. It is subjected to pressure and temperature conditions, such that its plastic matrix cures, and at the same time the window frame 6 is bonded with the laminate 22 on its faces in the region of its shoulders 12 and around its periphery in the region of its end sections 14. In accordance with the invention the already-cured window frames 6 here serve as integral tools, which as a result of their pressure- and temperature-resistant structure prevent any deformation of the laminate 22 in the region of the window apertures 4 during curing. In addition the window frames 4 are prevented from being displaced from their required position by the positioning aids 34 that are fixed in location on the mould surface 24.

After the curing and cooling of the laminate 22, the positioning aids 34 are removed from the mould surface 22 and prepared for reuse. The now-formed shell elements 2 are also extracted from the mould surface 24 and fed through to a further process such as, for example, fuselage assembly of shell elements 2 of this kind, and/or mechanical rework. The insertion of windowpane packs and their loading via corresponding pressure frames preferably takes place only directly before the cabin linings are installed in the fuselage.

Thus, the present invention provides a method for fitting a fuselage shell of a fibre-reinforced plastic-based composite material of an aircraft with a window frame, wherein a window frame of a fibre-reinforced plastic-based composite material is used as a solidification tool or curing tool for a wet fuselage shell, and is connected to the latter via a material bond; the invention also provides a device for implementing such a method.

While the invention has been particularly shown and described with reference to preferred embodiments thereof, it will be understood by those skilled in the art that various changes in form and details may be made therein without departing from the spirit and scope of the invention.

REFERENCE SYMBOL LIST

2 Shell element
4 Window aperture
6 Window frame
8 Wall
10 Shoulder
12 Surface section
14 End section
16 Projection
18 Wedge surface
20 Inner peripheral surface
22 Laminate
24 Mould surface
26 Tool
28 Hole
30 Hole axis
32 Axis of symmetry
34 Positioning aid
36 Inner contour
38 Outer contour
40 Pin

What is claimed is:

1. A method of fitting a fuselage shell of an aircraft with at least one window frame of a cabin window, the method comprising:
    positioning an uncured laminate including a fiber-reinforced plastic-based composite material configured to form a fuselage shell on a mold surface;
    introducing at least one window aperture into the uncured laminate;
    positioning a window frame including a cured fiber-reinforced plastic-based composite material on the uncured laminate in a region of the window aperture; and
    curing the laminate under an action of pressure and temperature so as to connect the window frame with the laminate by a material bond.

2. The method recited in claim 1, wherein the window frame includes a pressure-resistant and temperature-resistant material.

3. The method recited in claim 2, wherein the pressure-resistant and temperature-resistant material is disposed on a thermosetting plastic base.

4. The method recited in claim 1, further comprising securing the window frame in location on the mold surface with a positioning aid.

5. The method recited in claim 4, wherein the positioning aid has an outer contour that is complementary to an inner contour of the window frame.

6. The method recited in claim 4, further comprising securing the positioning aid on the mold surface using a positioning device.

7. The method recited in claim 6, wherein the positioning device includes a hole and the positioning aid is secured on the mold surface using a pin disposed on positioning aid.

* * * * *